United States Patent

[11] 3,582,894

[72] Inventor Robert C. Hoyler
　　　　　　Monroeville, Pa.
[21] Appl. No. 730,572
[22] Filed May 20, 1968
[45] Patented June 1, 1971
[73] Assignee Westinghouse Electric Corporation
　　　　　　Pittsburgh, Pa.

[54] CODED SIGNAL TRANSMISSION SYSTEM
　　　10 Claims, 2 Drawing Figs.
[52] U.S. Cl. .................................................... 340/168,
　　　340/22, 340/324
[51] Int. Cl. ...................................................... G08b 23/00,
　　　H04q 9/00
[50] Field of Search .......................................... 340/168,
　　　167, 147, 324, 324.1, 22

[56] References Cited
　　　UNITED STATES PATENTS
| | | | |
|---|---|---|---|
| 3,300,775 | 1/1967 | Dowling | 340/168SR |
| 3,336,587 | 8/1967 | Brown | 340/324 |
| 3,350,697 | 10/1967 | Hirvela | 340/147X |
| 3,307,169 | 2/1967 | Beck | 340/168X |

*Primary Examiner*—Donald J. Yusko
*Attorneys*—F. H. Henson and R. G. Brodahl

ABSTRACT: Coded signal transmission equipment is disclosed wherein a preselected train destination signal comprising a six-bit code signal coded to correspond to anyone out of 0 to 49 and/or a preselected train length signal comprising a six-bit code signal coded to correspond to anyone out of 50 to 59 are sent between a train vehicle and a selected wayside location. These numbers are the result of the particular coding technique employed. In general it is desired to send two coded signals and to separate those signals within the signal receiving equipment in a fail safe manner. For this purpose there is provided a wayside located signal receiving equipment which includes a signal register in which both the destination signal and the length signal are serially stored and shifted by a suitable shift control signal. A predetermined logic circuit arrangement is operative with a selected portion of the shift register to sense when a predetermined one of said signals is stored in said portion of the register to indicate that the register at that time is fully loaded and properly oriented. The desired coded signals can then be read out and utilized to indicate the train destination and/or the train length as may be desired.

A similar technique is employed to transmit coded vehicle performance signals back to the train vehicle.

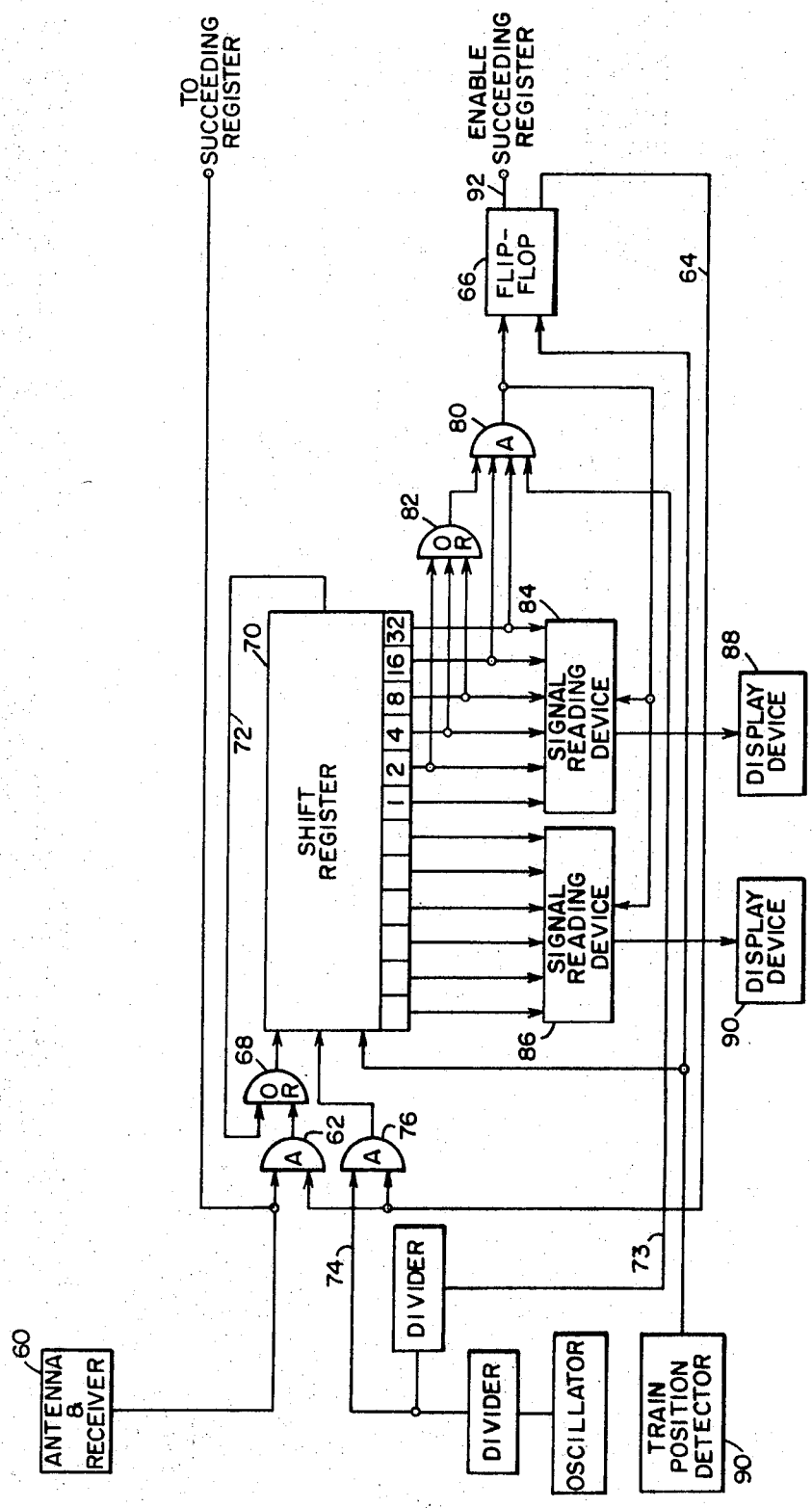

CODED SIGNAL TRANSMISSION SYSTEM

BACKGROUND OF THE INVENTION

In high speed train vehicle control applications there is an important requirement that the train vehicle be identified at specified wayside locations, such as passenger stations, along its travel route. This can be required for example in relation to the indication to passengers waiting at the station of the destination of a particular train vehicle or train of several vehicles, and further can be required for the purpose of locating the final stopping position of a train in regard to the length of a particular train of vehicles that is approaching a passenger station. It can be desirable to transmit from the train vehicle information consisting of a train destination code signal, which is received at the wayside location and energizes a particular passenger monitored display sign for example, and further a train length code signal. It can be desirable to transmit from the wayside station back to the train certain performance information or the like for the purpose of causing the train to slow down or to speed up its general response or other similar train control information as may be desired to be transmitted to the train vehicle.

Because of increasing requirements for high speed transportation, automatic transit systems and train control systems are gaining in importance and becoming more desirable to solve many of the problems associated with these requirements. An automatic train control system requires coded signal transmission from the moving train to the wayside location, such as a passenger platform, of the particular train identification information, consisting of information such as a destination for the train and the length of the train. This will indicate to the passengers where a particular train is going and inform the passengers how much of the length of a platform will be occupied by the particular train which is next to arrive. The train identification information is usually carried by the train and transmitted from a train carried antenna to an antenna associated with the train track and located some distance away from the platform, for example a mile, such that the train identification information is transmitted and received by the passenger station equipment a predetermined time prior to the arrival of the train to permit the passengers to have an adequate receipt of required information to maximize and facilitate the flow of passengers onto the train and from the train.

Certain information should be transmitted back to the train to optimize the operation of the train vehicle in relation to the desired operation of the entire high speed transportation system which is controlled by a monitoring control system. The problem here is to determine whether a given coded signal that is received from the train vehicle corresponds to the train destination or corresponds to the train length, and to implement means for effecting the desired transfer of this train identification information.

The prior art apparatus for transmitting information from train to wayside includes a manual interface using voice or printed information or automatic optical reading techniques. These methods have the disadvantages of being either slow and nonautomatic or limited by environment. Manual methods are presently the most common means for returning data to the train itself.

SUMMARY OF THE PRESENT INVENTION

In accordance with the present invention respective coded signals are assigned to the train destination and to the train length, such as a six-bit signal corresponding to 0 to 49 for the train destination and a six-bit signal corresponding to 50 to 59 is assigned to the train length. Thus by determining at the wayside whether a received coded signal is numerically greater or less than 50 it can be determined which coded signal has been sent in a particular time interval. Since both coded signals are sent together and serially from the train to the wayside, the present invention permits proper alignment of the two coded signals in a single station receiver register apparatus.

The train destination coded signal is stored in a first register on the train and continuously transmitted from the train while the train is moving. This is done by transferring it in parallel to a second register, operative as a shift register, which then transmits it serially from the train, through a train carried transmitter and antenna, and couples the so transmitted signal into a wayside located antenna operative with the wayside signal receiving equipment.

In accordance with the general operation of the train movement control system, the train vehicle receives a six-bit comma free coded signal for speed control, from which common word and bit rates may be derived to synchronize this identification signal transmission operation on both the train and at the wayside.

As an example of suitable comma free coded train speed control signals, the following are suitable six-bit signals for this purpose:

101111 - 80 m.p.h.
100111 - 70 m.p.h.
100011 - 50 m.p.h.
101011 - 34 m.p.h.
b 100101 - 27 m.p.h.
101001 - 18 m.p.h.
100000 - 12 m.p.h.
100001 - 6 m.p.h.
101000 - 0 m.p.h.

At points along the track where this information is needed from the train, such as passenger station locations, an antenna of sufficient length to pick up at least 12 serial bits of coded identification signal information from the train, at the top train speed of 80 miles per hour, is placed along the track. These signal bits are detected and stepped into a circulating 12-bit shift register synchronized to the common word and bit pulse rates. Once the register has accepted 12 bits of coded signal information, no matter which signal bit in the cycle was first received, the complete signal information will continue to circulate within the register at the bit rate even if the input to the register is removed due to the train carried antenna being no longer coupled to the wayside located antenna.

The presence of a number greater than 50 stored in the last section of the shift register at any work pulse time indicates the register to be fully loaded and to be properly oriented. This sets a control flip-flop which removes the input connection and removes the shift signal from the shift register, and at this time the length and destination coded signals are properly oriented in the register and can be read out as desired. As soon as these signals have been read out, the circulating shift register is reset to zero and enabled to receive a subsequent information signal transmission from a succeeding train.

Simple logic circuitry can be provided to switch a succeeding second shift register onto the input line connection to receive and store a second information signal transmission while the first information is still being processed if desired. By adding additional registers in this way as much storage capability as required can be provided.

In the requirements for one particular system, it is desirable to transmit a third coded signal containing train performance modification information back to the train while the train is stopped at the station location. This is done in essentially the same way, except that the performance modification information signal must go into a different register when received on the train. As before, the coded signal is assigned a numerical value greater than 50 and the signal received on the train is inspected at word intervals until the signal stored in the proper register section is greater than 50. At this time the input and shift signals are removed from this train carried register and the signal transmission is complete.

It is an object of the present invention to provide an improved and more reliable coded signal transmission system, which system is better operative to effect the desired transmission of one or more coded signals, such as train identification or control signals, between a first signal storage apparatus, which can be carried by a train vehicle, and a second signal storage apparatus, which can be located at a wayside position

BRIEF DESCRIPTION OF THE DRAWINGS

In FIG. 1 there is shown the train vehicle carried equipment, operative for sending the train destination and train length coded signals to a wayside location such as a passenger station, divergent point, or the like.

In FIG. 2 there is shown the wayside located logic equipment, operative for receiving the train destination and train length coded signals.

DESCRIPTION OF THE PREFERRED EMBODIMENT OF THE PRESENT INVENTION

Figure 1:
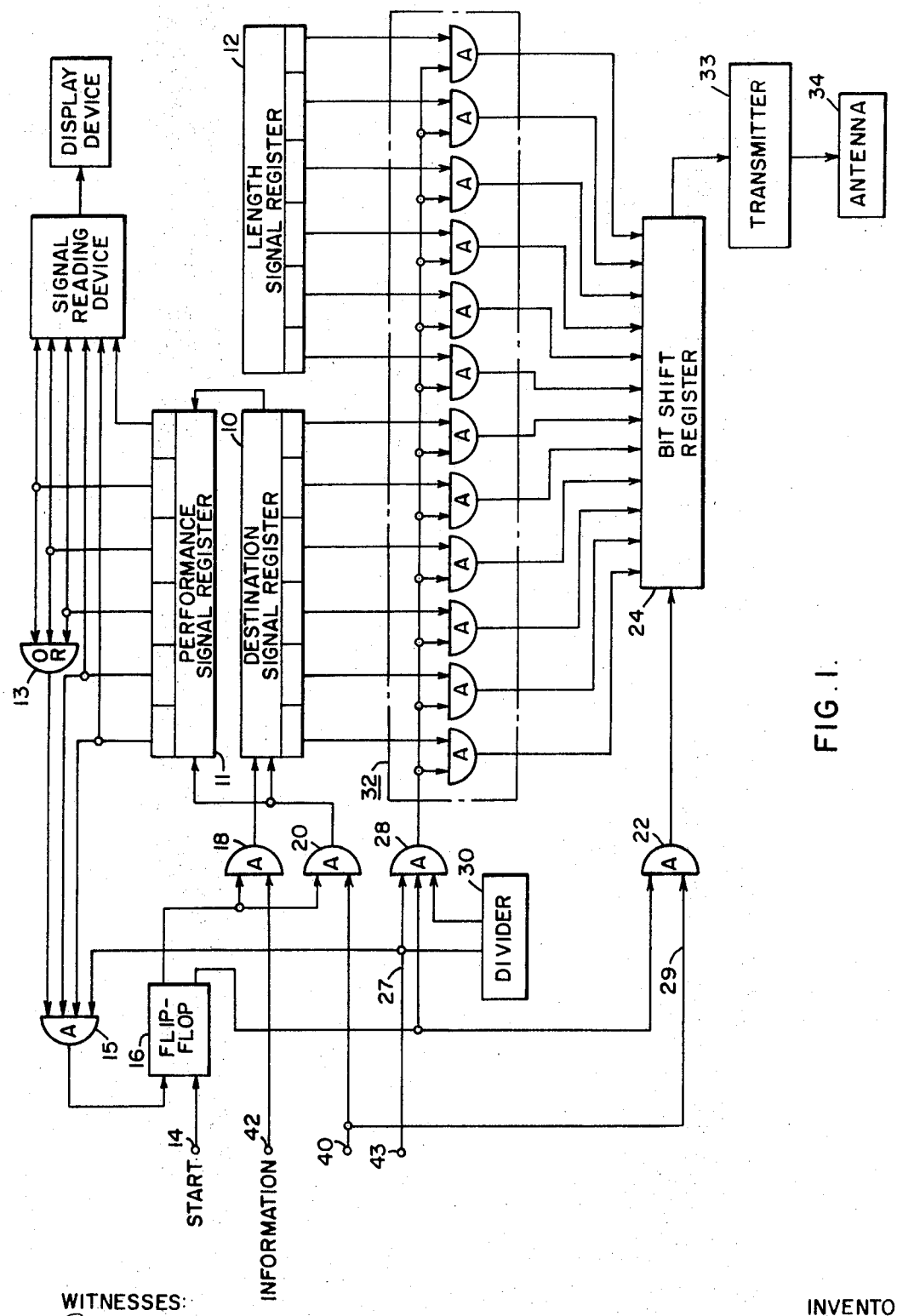

In FIG. 1 there is shown a first six-bit register 10 for containing the destination information of the train in the form of a six-bit code signal corresponding to a selected one of the numbers 0 to 49. A second six-bit register 12 more permanently is loaded with the train length information in the form of a six-bit code signal corresponding to a selected one of the numbers 50 to 59. When it is desired to load a destination signal into the register 10, or a train performance control signal into the register 11, a suitable start signal is applied to terminal 14 to cause a flip-flop 16 to change its state of operation such that a high level signal is thereby supplied to an input of AND device 18 and AND device 20.

In reference to FIG. 1 the start signal applied to terminal 14 is used only for the purpose of reading signal information into the six-bit registers 10 and 11. A first control line 40 supplies an 18 cycle/sec. bit rate signal through the AND gate 20 to shift the register 10 and 11 and applies through the AND gate 22 a bit rate signal to shift the 12-bit shift register 24. A second control line 43 is operative to supply a six-bit cycle/sec. word rate signal to one input of AND gate 28 and through a flip-flop divider 30 to a second input of the AND gate 28 such that the AND gate 28 has both of its inputs energized with simultaneous high level signals after the occurrence of every other word pulse to at this time provide an output signal to open the twelve AND gates 32 operative with the respective input signal bits of register 24 to allow the six-bit register 10 and the six-bit register 12 to transfer their respective signal contents into the 12-bit shift register 24 upon the occurrence of every other word rate signal pulse. The start signal applied to terminal 14 is for the purpose of changing the six-bit destination signal stored within the bit register 10. The train is continuously transferring information from the six-bit registers 10 and 12 into the shift register 24 and sending it out through the transmitter 33 and antenna 34 in a continuous and repetitive cycle of operation. This signal information is transmitted whenever the train is in operation whether the antenna 34 is coupled to the wayside antenna and receiver operative with the station equipment or not. This makes unnecessary the provision of a transmission operation start signal which is subject to failure. The train is continuously sending its destination and length information signals and wherever the wayside location desires this signal information a receiving antenna can be positioned to pick it up.

When it is desired to change the destination signal stored in the bit register 10, a suitable start signal is applied to terminal 14 and the modified destination information signal is supplied through the information conductor 42 leading to AND gate 18. For this purpose of supplying in serial arrangement the six signal bits of desired modified destination signal, a predetermined start signal could be supplied to the train, such as a one second duration signal or a specific code signal or the like with a suitable signal sensing device in the form of a predetermined logic circuit that could sense and apply the desired start signal to the terminal 14 when it is desired to change the destination signal stored within the bit register 10. Also, a coded signal receiver could be provided ahead of the start terminal 14 for this purpose if desired.

The destination signal information which is read in to modify the destination signal in the bit register 10 can be one or both of a destination modification signal and performance modification signal. When a start signal is received, the flip-flop 16 is changed in its operation to open the AND gates 18 and 20. The train carries a suitable receiver which can be coupled to a station located antenna for supplying a destination modification signal and a modified performance signal through the conductor 42; these two 6-bit signals are supplied in serial form with the modified performance signal being supplied first and being numerically between 50 and 59 and with the destination signal being supplied second and being numerically between 0 and 49, such that after 12 bits of signal information have rippled through the AND gate 18 into the six-bit register 10 and the six-bit performance register 11, the logic circuitry including the OR gate 13 in conjunction with the AND gate 15 senses the storage within the performance signal register 11 of the modified performance signal, which is greater than 50 such that the AND gate 15 provides an output signal to the flip-flop 16 to change its operation such that the AND gates 18 and 20 no longer pass signal information and shift signals respectively through to the register 10 and the register 11. With the AND gates 18 and 20 closed, this prevents undesired noise signal pulses from entering the registers 10 and 11. Thusly whenever it is desired to change the performance signal, it also changes the destination signal or at least the storage of the destination signal, because the performance modification signal must first pass through the destination signal register 10 in order to enter the performance signal register 11, after which the same or a different destination signal is again entered into the destination signal register 10.

In general the performance signal controls the acceleration rates of the train or determines that the train vehicle go faster or slower or a similar control function. The performance signal determines that the speed be decreased by 5 percent or by 10 percent or decrease the acceleration rate by 5 percent or 10 percent in an effort to optimize the operation of the train. A central control computer can be programmed to monitor the train operation and provide this performance modification information if it notices that the train vehicles in a particular location of the system are beginning to bunch up or some obstruction has occurred on the track or something of this type. When the train vehicles bunch up on the track, it is desired that the last ones be slowed down to open up the spacing between the vehicles and if suitable the first vehicle should be increased in speed to open the spacing between the vehicles.

The performance signal is differentiated from the destination signal by assigning to the performance signal a numerical value between 50 and 59 and by assigning to the destination signal a numerical value between 0 and 49. This permits us to sense through the OR gate 13 and AND gate 15 that the numbers stored within the performance signal register 11 is greater than 50 and therefore it is the performance signal; further when a number having a numerical value greater than 50 is stored within the performance signal register 11, this informs the control apparatus that the signal transmission to change the performance signal and/or the destination signal has been completed, such that the flip-flop 16 should be changed in its operation to now close the AND gates 18 and 20. It should be understood that the performance signal stored within the performance signal register 11 is then utilized for controlling the train propulsion equipment as should be readily apparent to persons skilled in this art for the purpose of controlling the movement of the train vehicle. An alternate way of providing the modified performance signal would be to utilize a train carried local signal generator, other than the signal receiver previously described, which would enable an operator on the train to change the performance signal stored within a performance signal register 11 and/or the destination signal stored within the destination signal register 10 if this were desired. The 18-cycle/sec. bit rate signal from the control line 40 is applied through the AND gate 22 to shift the 12-bit register 24 to continuously supply in a serial manner the respective destination and length code signals to a transmitter 33 and antenna 34 while the train is in motion. It is thus seen that the AND gate 28 provides an output signal to open each of the respective AND gates 32 and effects a transfer in parallel from the two 6-bit registers 10 and 12 into the 12-bit shift register 24, which then is operative to sequentially shift the individual bits to the transmitting antenna 34 in accordance with the 18-cycle/sec. bit rate signal from the control line 40. The 3-cycle/sec. word rate signal from the line 43 and the 18-cycle/sec. bit rate signal from the line 40 synchronize the train identification signal transmission on the train and a similar signal synchronization controls the receiving of these signals by the wayside station.

In FIG. 2 there is shown the wayside located equipment used for receiving the train destination and train length coded signals at points along the train movement path where this information is needed, such as at passenger stations, and the like. A receiving antenna 60, of sufficient length to pick up at least the 12 bits of signal information serially transmitted from the moving train, is suitably placed along the train track. The train transmitted signals are picked up, amplified, and passed to one input of an AND gate 62 which has its second input energized from the conductor 64 from the flip-flop 66 which at this time provides a high level output signal to the conductor 64. The received 12 bits of signal information pass through the AND gate 62 and the OR gate 68 into a 12-bit shift register 70. The operation of the latter register 70 is synchronized to the 3-cycle/sec. common word and 18-cycles/sec. bit rate pulses received from the respective control lines 73 and 74, which same word rate and bit rate pulses are provided on the train. Once the shift register 70 has accepted the 12 bits of coded signal information, no matter which bit in the cycle is first received, the complete 12 bits of signal information will continue to circulate through operation of the conductor 72 as shifted by the 18cycle per second bit rate signal -cycle over the conductor 74 to AND gate 76 which has its second input energized by the high level output signal from the flip-flop 66, such that each bit rate signal from the control line 74 passes through the AND gate 76 and is effective to shift by one bit the signal stored within the shift register 70. With the provision of the conductor 72 connected through the OR gate 68, when the train supplied signal from the receiving antenna 60 is removed, the complete 12 bits of signal information stored within the shift register 70 will continue to circulate at the bit rate frequency. The presence of a stored number greater than 50 in the last half section of the register 70 at a word pulse time is sensed by the logic gates 80 and 82 and indicates the register is fully loaded and is properly oriented. For this purpose the AND gate 80 is connected to respond to the binary 32 stored in the sixth-bit position and the binary 16 stored in the fifth-bit position of the second half of the shift register 70; through the OR gate 82 any one of the binary eight-bit position, the binary four-bit position or the binary two-bit position also energizes the AND gate 80 such that the sixth-bit position and the fifth-bit position provides a total count of 48, and any one of the other binary bits operative through the OR circuit 82 will cause the AND gate 80 to sense a stored signal within the last six stages of the shift register 70 of a value greater than 50. This sets the flip-flop 66, which now removes the high level signal supplied to the conductor 64 and this will block the AND gate 62 and block the shift pulses supplied through the AND gate 76. At this time the destination code signal and the length code signal are stationary and properly aligned in the register and can be read out as required. For example a suitable signal reading device 84 can be responsive to the length code signal stored within the six stages of the last half of the shift register 70, and a signal reading device 86 can be connected to indicate the destination code signal stored within the six stages of the first half of the shift register 70. Suitable display devices 88 and 90 in the form of respective signs or the like can be provided to indicate or further utilize as desired the destination code signal and the length code signal so determined. As soon as these signals have been read and utilized, the circulating shift register 70 is reset to zero by for example a manual switch or a train position detector 90 which can be energized when the train leaves the station platform and provides a signal to reset the shift register 70 and to reset the flip-flop 66.

The antenna and receiver 60 shown in FIG. 2 may be located up to a mile down the train track ahead of the station location at which is provided the apparatus shown in FIG. 2.

If desired, suitable logic circuitry could be provided to switch another shift register similar to register 70 onto the input line connected to the receiving antenna 60 to receive and store a subsequent signal transmission from a succeeding train while the first transmission is still being processed by the shift register 70. By adding additional registers in this way as much signal storage capacity as required can be provided. The high level output signal from the flip-flop 66 and applied to conductor 92 could be utilized to control the enabling of these succeeding registers as desired.

In the requirements for one particular train control system for which this equipment was applied it was necessary to transmit from a passenger station location back to the train another multiple bit coded signal containing a performance modification to tell the train to do a selected one of increase its speed or decrease its speed and/or change its acceleration patterns or the like; the latter signal transmission can occur while the train is stopped at the station platform. This signal transmission back to the train is done in substantially the same way and with generally similar equipment as previously described in relation to the train length and train destination signals, with the modification signal going into its own and separate register 11 as shown in FIG. 1 when received on the train. The modification signal received on the train is inspected at word intervals until the signal in the register 11 is greater than 50. At this time the input and shift signals are removed from the train carried registers and the signal transmission process is complete. The performance modification signal can then be read and utilized aboard the train as desired.

Some advantages of the present system over prior art existing systems is that it is bidirectional in operation, completely automatic, independent of environment, compatible with the signalling and synchronization in the here accompanying train control system, and the signal information can be easily modified as required. This latter signal modification could include a change in stored information as well as a change in the type of information sent. At the present time there is a need for the present signal transmission apparatus to send and receive train identification signals as a part of an overall train control system or transmit this information as an ordered sequence in a two word distribution.

For a description of one suitable train control system with which the present coded signal transmission system is operative, see an article appearing in Railway Signaling & Communications magazine for Dec. 1967 at pages 18 to 23 and entitled The BARTD Train Control System by W. P. Bollinger.

While the present invention has been described with a certain degree of particularity it should be understood that various modifications and changes thereof will be readily apparent and can be made within the scope and spirit of the present invention.

I claim as my invention:

1. In a signal transmission system including first equipment for transmitting a predetermined signal comprising a plurality of binary bits, and second equipment for receiving said signal, the combination of:

first signal storage means associated with said first equipment for storing said signal before said first equipment transmits said signal;

second signal storage means associated with said second equipment for storing said signal after the signal has been transmitted and is received;

signal coupling means operative for at least a predetermined time interval to couple said signal for transmission from said first equipment to said second equipment;

and signal responsive means operative with one of said signal storage means for responding to a storage of at least a given number of said plurality of binary bits in a predetermined location within said one signal storage means to control the time interval during which said signal coupling means is operative.

2. The signal transmission system of claim 1, with said signal including a first portion and a second portion, said second portion being numerically different than said first portion, and with said given number of said plurality of binary bits being located in said second portion of said signal for determining the location within said one signal storage means where said given number of binary bits are stored.

3. The signal transmission system of claim 1, with said signal including at least one multiple bit word of information, and control means for sensing the rate of bit transmission by said system, said one signal storage means comprising a shift register for storing at least one word of information and being operative with said control means for shifting the bits of said one word through said shift register, and said signal coupling means being operative to receive serially the so shifted bits of said one word from said shift register.

4. In a coded signal transmission system operative with at least one predetermined signal having a plurality of bits, the combination of:

first signal means for storing said coded signal and including a first shift register into which said coded signal is fed;

signal coupling means for removing said coded signal from said first signal means;

second signal means for storing said coded signal and including a second shift register operative with said signal coupling means for receiving said coded signal from said first signal means;

control means operative with at least one of said shift registers for circulating said coded signal within at least said one shift register until there occurs a predetermined arrangement of said bits; and means responsive to the predetermined arrangement of said bits within said one shift register and operative with said signal coupling means for transmitting said coded signal from said first signal means to said second signal means during the interval of time said predetermined arrangement of bits occurs.

5. The signal transmission system of claim 4, with said first signal means including a signal register for initially storing a coded signal to be periodically transmitted to said first shift register;

and means for shifting said coded signal through said first shift register to said signal coupling means in a serial bit by bit manner.

6. The signal transmission system of claim 5, including shift signal means providing a bit rate control signal determined by the signal transmission bit rate of said system for shifting the coded signal stored in said second shift register at said bit rate, and signal indication means operative with said second shift register and responsive to said coded signal stored in said second shift register for indicating the completion of said coded signal transmission.

7. In a signal transmission system including a first station for transmitting a signal comprising a plurality of binary bits and a second station for receiving said signal, the combination comprising:

first signal storage means operative with said first station for storing said signal for a first given amount of time before said first station transmits said signal;

second signal storage means operative with said second station for storing said signal for a second given amount of time after the signal has been transmitted by said first station and received by said second station;

signal coupling means operative during time intervals, which may be different in length of time from one interval to the next, for coupling said signal for transmission from said first station to said second station; and signal responsive means operative with said first signal storage means for responding to a storage of at least a given number of said plurality of binary bits in a predetermined location within said first signal storage means to control the time interval during which said signal coupling means is operative.

8. The signal transmission system of claim 7, with said first signal storage means comprising:

a first shift register which receives at least a portion of said signal to be transmitted;

a second shift register connected in series with said first shift register such that said signal may be recirculated through said first and second registers; and a third shift register connected to said first shift register to receive the signal stored in said first shift register, said third shift register being connected to said signal coupling means.

9. The combination claimed in claim 8, with said signal responsive means comprising:

at least one gate having a plurality of input terminals and an output terminal, said plurality of input terminals being connected in a predetermined arrangement to said second shift register for producing a set pulse at said output terminal in response to the storage of at least said given number of said plurality of binary bits in said predetermined location in said second shift register;

A flip-flop having a set terminal and an output terminal, said set terminal being connected to the output terminal of said one gate for receiving said set pulse and producing in response thereto a shift signal at said output terminal of said flip-flop; and means for applying said shift signal to said third shift register for transmitting said signal from said third shift register to said signal coupling means.

10. The combination claimed in claim 9, with said second signal storage means comprising:

a fourth shift register connected to said signal coupling means for receiving and storing said signal; and means responsive to the storing of said signal for displaying said signal.